J. J. GILLINGER.
COMBINED SUPPORT AND WATER DEFLECTOR FOR WATER WHEELS.
APPLICATION FILED APR. 24, 1918.
1,292,454.
Patented Jan. 28, 1919.
2 SHEETS—SHEET 1.
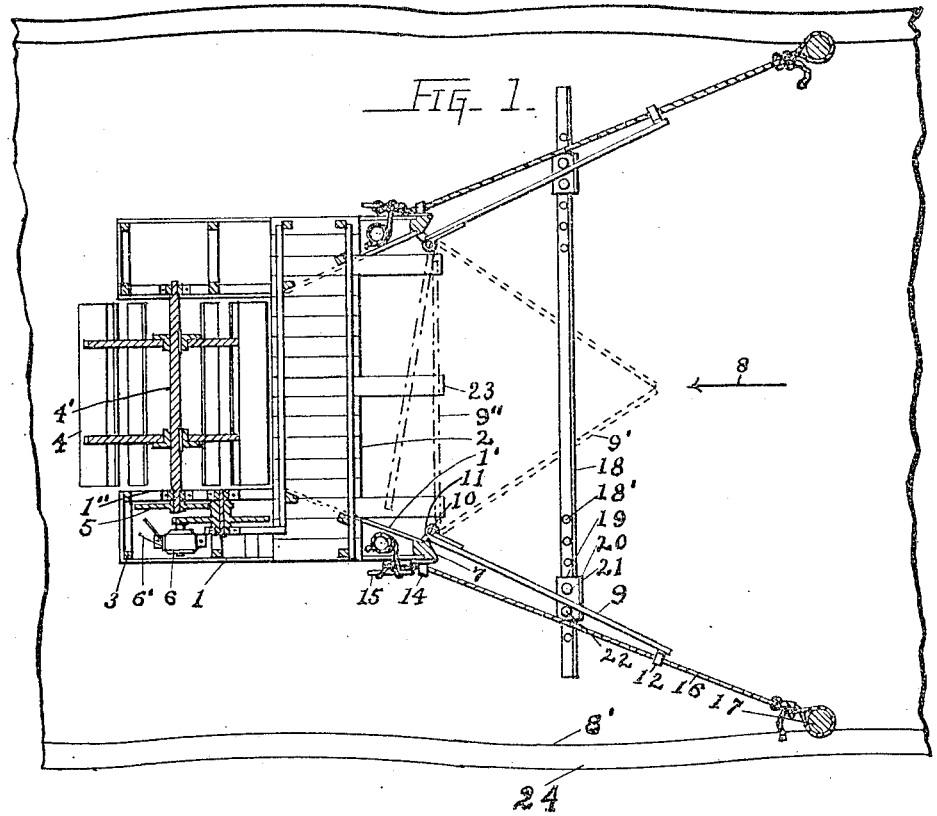
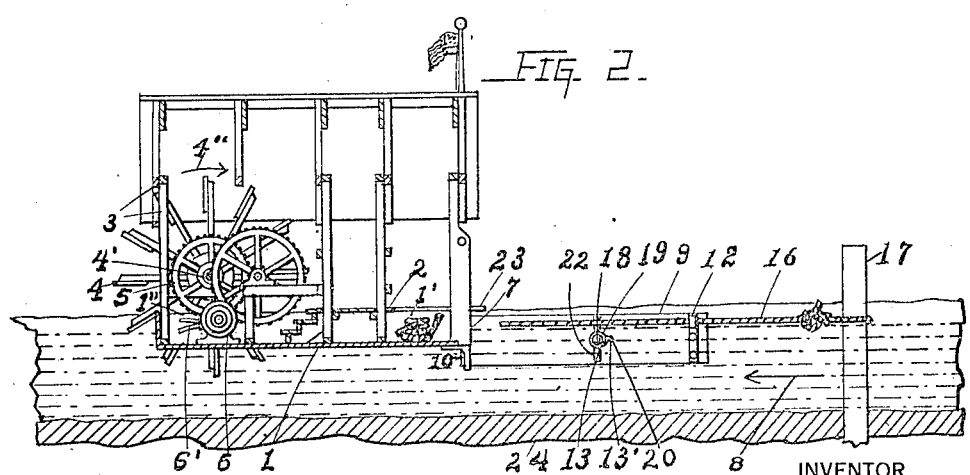
INVENTOR
Jeremiah J. Gillinger.
BY
George W. Hinton.
ATTORNEY J. J. GILLINGER.
COMBINED SUPPORT AND WATER DEFLECTOR FOR WATER WHEELS.
APPLICATION FILED APR. 24, 1918.
1,292,454.
Patented Jan. 28, 1919.
2 SHEETS—SHEET 2.
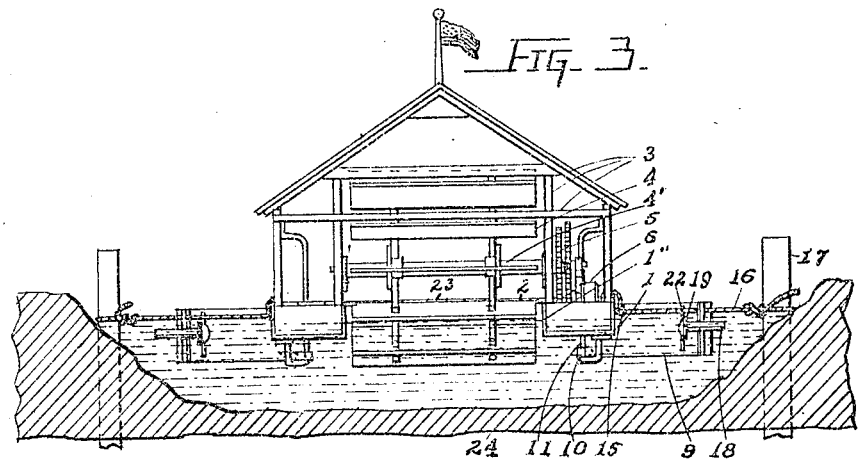
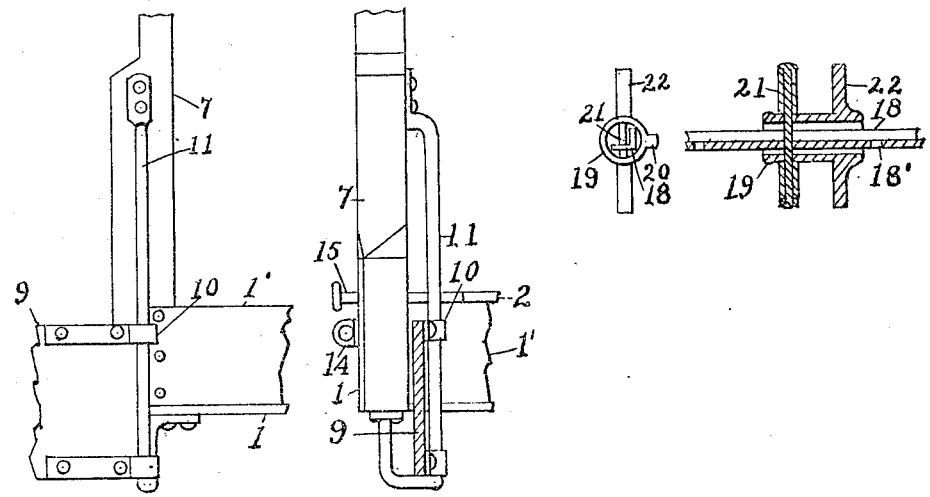
INVENTOR.
Jeremiah J. Gillinger,
BY George W. Hinton.
ATTORNEY

UNITED STATES PATENT OFFICE.

JEREMIAH J. GILLINGER, OF QUITMAN, MISSOURI.

COMBINED SUPPORT AND WATER-DEFLECTOR FOR WATER-WHEELS.

1,292,454.   Specification of Letters Patent.   Patented Jan. 28, 1919.

Application filed April 24, 1918. Serial No. 230,414.

*To all whom it may concern:*

Be it known that I, JEREMIAH J. GIL-LINGER, a citizen of the United States, residing at Quitman, in the county of Nodaway and State of Missouri, have invented certain new and useful Improvements in Combined Supports and Water-Deflectors for Water-Wheels, of which the following is a specification, reference being had thereto in the accompanying drawing.

My invention relates to improvements in combined supports and water deflectors for water wheels, and the objects of my improvements are, first, to provide simple, substantial and durable supports for water wheels, that shall keep the wheel supported thereon, at a predetermined depth in the water, regardless of the rising and falling of the stream; second, to so shape said supports that they will deflect running water against said wheel and be adapted to have deflectors connected therewith; third, to provide water deflectors and deflector connecting means whereby said deflectors are so connected with said supports that they deflect flowing water between said supports and against said wheel, for exerting the maximum of potential energy of said water on said wheel for rotating the latter; fourth, to so construct and arrange the deflectors and wheel supports that they will adjust themselves automatically to variations in direction in which the stream may flow, and can be secured in proper position for deflecting debris, such as ice, driftwood and the like, from the water wheel; fifth, to so construct and arrange the deflectors, that they can be lifted from the water onto the wheel supports in such position that said supports can be easily moved through the water; sixth, to so construct said wheel supports that they shall be suitable for supporting electrical generating mechanisms and afford conveniences for attendants and visitors.

I attain these objects by the mechanism illustrated in the accompanying drawings, in which:—

Figure 1 is a top plan of the invention, certain parts being broken away. Fig. 2 is a side view of the parts seen in Fig. 1, certain parts being broken away. Fig. 3 is a rear view of the invention. Fig. 4 is an enlarged side view, in detail, of one of the deflector hinges. Fig. 5 is a front view of the parts seen in Fig. 4. Fig. 6 is an enlarged end view in detail, of one of the brace sleeves. Fig. 7 is a vertical section, cut through the center of the parts seen in Fig. 6, looking toward the right.

The novelty in the invention lies in the particular form of scows, the hinging to their prows of the water deflectors, and the deflector bracing means, as hereinafter fully described.

Referring to Figs. 1 and 3, the two scows 1 are rigidly secured together, by the walk 2 and the frame-work 3, with a predetermined space between said scows.

The water wheel 4 is provided with shaft 4', which latter is rotatably mounted on said scows, with said wheel in said space. Said shaft is provided with a set of speed increasing gears 5, which are gear connected with the electric generator 6, which latter is mounted in one of said scows, and is provided with electric conductors 6', of which but small portions are shown. Said conductors are adapted to have other conductors connected therewith, for conducting energy to distant places, for various purposes, such as light, power, etc.

Since said gears and generator may be of any kind now in use, the same are not fully described.

Said scows are each provided with a bow piece 7, the lower end portions of which are secured in the bows of said scows, respectively. The inner sides 1' of said bows are inclined backward and toward each other, from said bow pieces, to the inner sides 1" of said scows, which latter are parallel to each other, and have wheel 4 mounted between them.

The bow sides 1' act as deflectors, for deflecting water therebetween, which flows in the direction indicated by arrow 8, the edges of said water being bounded by river banks 8'.

The down stream end of each one of deflectors 9 has a pair of hinge eyes 10 secured thereon, (see Figs. 4 and 5,) which are slidably and oscillatably mounted on hinge rod 11, the lower end portion of which is return bent, with its extremity secured on the bottom of its respective scow 1.

The upper end of said hinge rod is secured on its respective bow piece 7.

The up-stream end of said deflector has rope guide 12 secured thereon, and brace aperture 13 formed through its intermediate portion, as seen in Fig. 2.

Rope guide 14 and cleat 15 are secured on the outer side of said scow, at its bow. One end of rope 16 is secured on pile 17, its other end being passed through said rope guides and around said cleat, on which said rope is adjusted as to reach, and is secured thereon. The free end portion of said rope is coiled in said scow.

Deflector brace 18 is preferably formed of angle steel, and has a plurality of apertures 18' formed therethrough.

The ends of said brace are each provided with a brace sleeve 19, slidably adjusted thereon. Since said sleeves are alike in construction and operation, but one is described.

Said sleeve is slid on said brace to the desired adjustment and pin 21 is passed therethrough and through one of apertures 18', for holding said sleeve in place. Said pin limits inward movement of deflector 9. Outward movement of said deflector is limited by stud 22, which is formed on the outer end portion of said sleeve.

Said sleeve has flange 20 formed on one side thereof, which passes through the extended portion 13' of aperture 13, for holding said sleeve against rotation, as seen in Fig. 2.

Deflector supports 23 are formed with walk 2, for supporting deflectors 9, while the same are folded for transportation, as hereinafter described.

In installation, with the deflectors in the position indicated by dot and dash lines 9", (see Fig. 1,) the installer drives piles 17 into ground 24, (see Figs. 2 and 3,) after which he tows scows 1 to the approximately desired position, down stream from said piles, passes rope 16 through rope guides 12 and 14, and secures the free end of said rope to said piles, with deflectors 9 in the position shown. He and an assistant then grasp the opposite end portions of said ropes respectively, and loosen the same on cleats 15.

They then pay out a portion of said ropes, thereby allowing said scows to drift down stream, until they are in the desired position. They then secure said ropes on said cleats, and thereafter place brace 18 and sleeves 19 in the position shown.

While said deflectors are in this position they deflect the surface portion of the water passing between them, and direct it between the inclined bow sides 1', (see Fig. 1,) which latter act as extensions of said deflectors and still further deflect said water until it reaches and moves against the submerged portion of wheel 4, thereby rotating the same.

This drives shaft 4', which rotates gears 5 and the therewith connected electric generator 6.

It will be understood, that where the stream of water is more shallow than shown the deflectors 9 almost reach ground 24, and in some places might rest upon said ground. If in the last mentioned position, they would efficiently deflect practically all of the water flowing between them.

In all cases said deflectors deflect a certain amount of said water, thereby augmenting the speed of the same, thus increasing the efficiency of water wheel 4.

Deflectors 9 can be used for deflecting ice, drift wood, and the like, from wheel 4, by placing them in the position indicated by dotted lines 9', and securing them in this position in any well known manner, not shown.

For transportation, said deflectors are lifted and swung on hinge bars 11, to the position indicated by dot and dash lines 9", resting on supports 23, as seen in Fig. 1.

Having fully described my invention, what I claim as new, and desire to secure by Letters Patent, is:—

1. The combination with a pair of scows rigidly secured together with a predetermined space between them; of bow sides adapted to deflect water along the entire width of said scows into said predetermined space; a water deflector for each scow said deflector being connected with the prow of its respective scow in such manner that it can be swung in a horizontal plane for adjusting its angle of inclination to said scow and can be moved vertically for placing the same in position supported by said scows.

2. The combination with a pair of scows rigidly secured together at a predetermined distance from each other said scows having outer sides extending from their sterns to their prows in a straight line; of a bow piece for each scow forming the prows thereof and extending thereabove; inclined bow sides extending from said bow pieces backward to the inner sides of said scows respectively said inner sides being parallel with each other; a hinge rod for each scow the lower end of said rod being secured on the bottom of the prow portion of its scow and having its upper end secured on its bow piece; a water deflector for each scow one end of said deflector being slidably and oscillatably mounted on its respective hinge rod while the other end of said deflector is adapted to be moored to a fixed object; bracing means whereby the intermediate portions of said deflectors are held at a predetermined distance from each other; adjusting means whereby said brace is adjustably connected with said deflectors; and a water wheel rotatably mounted between said scows.

3. The combination with a pair of water deflectors having holding means whereby the ends of said deflectors are held in inclined positions for deflecting water therebetween, said deflectors each having an annular brace aperture formed through its intermediate portion; a sleeve slidably splined in each one of said apertures; holding studs connected with said sleeve for holding one of said deflectors therebetween against lateral movement; a brace having a plurality of adjusting apertures formed through its end portions; and securing means passed through certain ones of said adjusting apertures and through apertures in said sleeves for adjustably securing said end portions of said brace in said sleeves.

In testimony whereof I affix my signature.

JEREMIAH J. GILLINGER.

Copies of this patent may be obtained for five cents each, by addressing the "Commissioner of Patents, Washington, D. C."